US008732055B1

(12) United States Patent
Dinamani et al.

(10) Patent No.: US 8,732,055 B1
(45) Date of Patent: May 20, 2014

(54) METHOD AND SYSTEM FOR PERFORMING A FINANCIAL REWIND

(75) Inventors: Vidya Dinamani, San Diego, CA (US); Richard N. Preece, San Diego, CA (US); David D. Taylor, San Marcos, CA (US); Keith A. Greener, San Diego, CA (US); Alan Tifford, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 824 days.

(21) Appl. No.: 12/276,124

(22) Filed: Nov. 21, 2008

(51) Int. Cl.
*G06Q 40/00* (2012.01)
*G06Q 10/00* (2012.01)
*G06Q 40/02* (2012.01)
*G06Q 40/08* (2012.01)

(52) U.S. Cl.
CPC .............. *G06Q 40/00* (2013.01); *G06Q 10/00* (2013.01); *G06Q 40/025* (2013.01); *G06Q 40/08* (2013.01)
USPC ................ 705/36 T; 701/35; 705/4; 235/382; 717/168; 709/206

(58) Field of Classification Search
USPC .............. 705/7, 14, 31, 35, 36 R, 64; 701/35; 281/31
See application file for complete search history.

(56) References Cited

U.S. PATENT DOCUMENTS

| | | | | |
|---|---|---|---|---|
| 5,842,185 A * | 11/1998 | Chancey et al. | ................. | 705/40 |
| 5,931,878 A * | 8/1999 | Chapin, Jr. | ........................ | 701/30 |
| 6,032,134 A * | 2/2000 | Weissman | ........................ | 705/40 |
| 6,301,533 B1 * | 10/2001 | Markow | ........................ | 701/35 |
| 6,507,825 B2 * | 1/2003 | Suh | ................................. | 705/30 |
| 6,792,422 B1 * | 9/2004 | Stride et al. | ................... | 707/693 |
| 6,883,708 B1 * | 4/2005 | Fiedler et al. | ................. | 235/380 |
| 7,308,426 B1 * | 12/2007 | Pitroda | ........................... | 705/35 |
| 7,664,801 B2 * | 2/2010 | Walker | ........................... | 707/707 |
| 7,815,100 B2 * | 10/2010 | Adams et al. | ................. | 235/375 |
| 7,818,143 B2 * | 10/2010 | Delargy | ........................ | 702/177 |
| 7,908,191 B1 * | 3/2011 | Dinamani et al. | .............. | 705/31 |
| 7,925,553 B2 * | 4/2011 | Banks et al. | .................... | 705/31 |
| 7,966,329 B1 * | 6/2011 | Rukonic et al. | ............... | 707/737 |
| 8,429,046 B2 * | 4/2013 | Pitroda | ........................... | 705/35 |
| 8,538,789 B1 * | 9/2013 | Blank et al. | .................. | 705/7.11 |
| 2002/0133436 A1 * | 9/2002 | Hermreck et al. | ............. | 705/31 |
| 2003/0065677 A1 * | 4/2003 | Culp et al. | .................. | 707/104.1 |
| 2004/0122905 A1 * | 6/2004 | Smith et al. | ................... | 709/206 |
| 2004/0243489 A1 * | 12/2004 | Mitchell et al. | ................. | 705/30 |
| 2005/0154617 A1 * | 7/2005 | Ruggieri et al. | .................. | 705/4 |

(Continued)

OTHER PUBLICATIONS http://www.outlookcode.com/codedetail.aspx?id=1577, 2007 (VBS).*

(Continued)

*Primary Examiner* — Chika Ojiaku
(74) *Attorney, Agent, or Firm* — Osha Liang LLP

(57) ABSTRACT

A computing device of a user, including a processor, a memory, an electronic organization application comprising software instructions stored in memory and executed on the processor to store a plurality of activities associated with the user, and a rewind application configured to interact with the electronic organization application and including software instructions stored in memory and executed on the processor to present at least one question associated with each of the plurality of activities stored in the electronic organization application, receive a response to the at least one question, determine whether each of the plurality of activities is of a predetermined category based on the response received to obtain a subset of the plurality of activities, and store, in a repository, data associated with the subset of the plurality of activities for use in a financial application.

20 Claims, 4 Drawing Sheets

(56) References Cited

U.S. PATENT DOCUMENTS

| | | | |
|---|---|---|---|
| 2005/0252963 A1* | 11/2005 | Adams et al. | 235/382 |
| 2005/0257209 A1* | 11/2005 | Adams et al. | 717/168 |
| 2006/0123461 A1* | 6/2006 | Lunt et al. | 726/1 |
| 2006/0178961 A1* | 8/2006 | Stanley et al. | 705/31 |
| 2007/0150139 A1* | 6/2007 | Hardy | 701/35 |
| 2007/0208503 A1* | 9/2007 | Harnsberger | 701/208 |
| 2007/0250258 A1* | 10/2007 | Hager | 701/201 |
| 2007/0250418 A1* | 10/2007 | Banks et al. | 705/31 |

OTHER PUBLICATIONS

Business Wire, Nifty New Software From iiMap Tracks Car Mileage for Tax deductions, Jan. 30, 2007—http://www.businesswire.com/news/home/20070130005464/en/Nifty-Software-iiMap-Tracks-Car-Mileage-Tax (Nifty).*

* cited by examiner

METHOD AND SYSTEM FOR PERFORMING A FINANCIAL REWIND

BACKGROUND

When filing a tax return, a taxpayer (i.e., an individual or business) generally has an opportunity to claim one or more tax deductions, also referred to as tax-deductible expenses. A tax deduction represents an expense incurred by the taxpayer, and may be subtracted from the taxpayer's reported gross income, thereby yielding a lower net income. A lower net income typically incurs lower taxes. Therefore, taxpayers are generally interested in identifying and claiming as many tax deductions as possible.

However, filing a tax return is a complex process, and it may be difficult for the taxpayer to identify all of the tax deductions available. For example, the number of miles traveled in a car or other transport device for business or charity related work is a tax deductible expense. Often times, taxpayers do not include the number of miles driven in a car for business or charity related travel as a deductible expense because it is an easily forgotten tax deductible expense. Therefore, each tax year, many individuals and businesses fail to take advantage of the full extent of tax deductions available to them.

SUMMARY

In general, in one aspect, the invention relates to a computing device of a user, comprising a processor, a memory, an electronic organization application comprising software instructions stored in memory and executed on the processor to store a plurality of activities associated with the user, and a rewind application configured to interact with the electronic organization application and comprising software instructions stored in memory and executed on the processor to present at least one question associated with each of the plurality of activities stored in the electronic organization application, receive a response to the at least one question, determine whether each of the plurality of activities is of a predetermined category based on the response received to obtain a subset of the plurality of activities, and store, in a repository, data associated with the subset of the plurality of activities for use in a financial application.

In general, in one aspect, the invention relates to a computer readable medium for comprising instructions, when executed on a processor, for unwinding activities of a user of a computing device, wherein the instructions are configured to present, to the computing device, at least one question associated with each of a plurality of activities stored in the electronic organization application, receive a response to the at least one question from the computing device, determine whether each of the plurality of activities is of a predetermined category based on the response received to obtain a subset of the plurality of activities, and store data associated with the subset of the plurality of activities for use in a financial application.

In general, in one aspect, the invention relates to a method for unwinding activity of a user of a computing device, comprising presenting, to the computing device, at least one question associated with each of a plurality of activities stored in the electronic organization application, receiving a response to the at least one question from the computing device, determining whether each of the plurality of activities is of a predetermined category, based on the response received, to obtain a subset of the plurality of activities, and storing, in a repository, data associated with the subset of the plurality of activities for use in a financial application.

Other aspects of the invention will be apparent from the following description and the appended claims.

DETAILED DESCRIPTION

Figure 1:
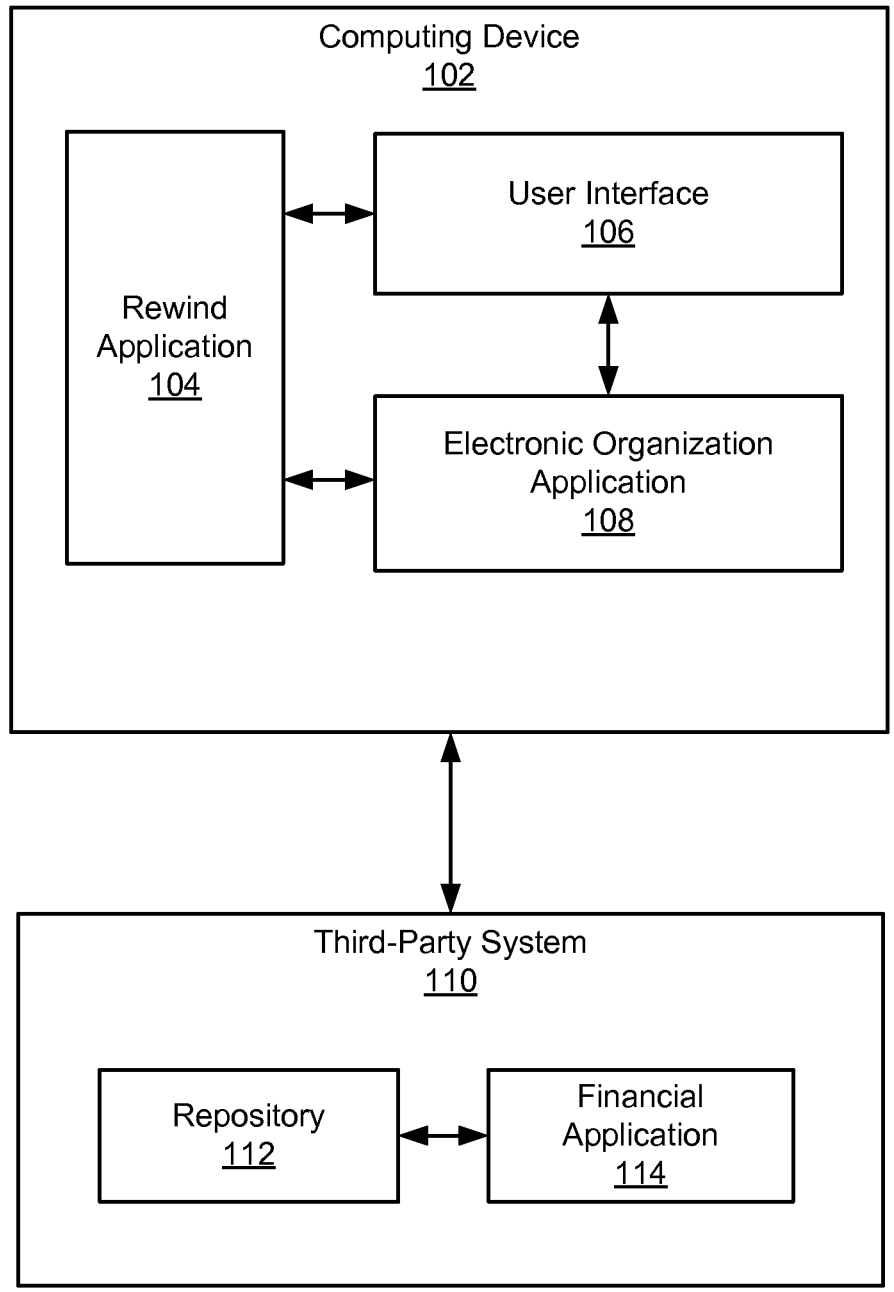
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for proactively capturing deductible activities performed by a user. Specifically, embodiments of the invention provide a method and system for unwinding a user's day or week and gathering data from the user when the user is reconciling financial data. The data obtained by looking backward over a specific period of time is used to determine tax deductible expenses for the user.

FIG. 1 shows a system in accordance with one or more embodiments of the invention. Specifically, the system of FIG. 1 includes a computing device (102) and a third-party system (110). The computing device (102) includes a user interface (106), a rewind application (104), and an electronic organization application (108). The third party system (110) includes a repository (112) and a financial application (114). Each of the aforementioned components is described below.

The computing device (102) may be any desktop computer or personal computer associated with a user. Alternatively, the computing device (102) may be any hand-held electronic device, such as a smart phone, a personal digital assistant, a gaming device, etc. Those skilled in the art will appreciate that although not shown in FIG. 1, the computing device includes essential components found in most electronic devices, such as a processor for executing the rewind application (104), a memory for storing the rewind application and data, a display device, and an external communication interface for connecting to any wired or wireless network. The computing device (102) includes a rewind application (104), a user interface (106) and an electronic organization application (108).

In one or more embodiments of the invention, the user may be any individual, sole proprietor, and/or small business owner that files taxes and manages financial information associated with a business or as an individual.

In one or more embodiments of the invention, the rewind application (104) is a plug-in software application that is operatively connected with the electronic organization application (108). Alternatively, the rewind application (104) may be a standalone software application that is downloaded onto the computing device (102). In one or more embodiments of the invention, the rewind application (104) is configured to present a series of questions to a user to "unwind" the user's day (or another specific time period, such as a week, a month, etc.). More specifically, the rewind application (104) is configured to present the user with a set of questions when the user is reconciling the activities performed during a specific time period to determine which activities were related to a business expense, a tax deductible expense, etc. The rewind application (104) is also configured to receive the user's response to the questions. In one or more embodiments of the invention, the questions presented by the rewind application (104) may be determined from data stored in the electronic organization application (108), from the user's credit card statements, from the user's banking data, from a user's global positioning satellite (GPS) or smart phone that tracks the user's mileage driven in a motor vehicle, from any combination of the above-mentioned data sources, and/or from any other suitable data source that may include data related to a user's activities. In one or more embodiments of the invention, the rewind application (104) is configured to identify, based on the user's response to the questions presented, a specific category of activities performed by the user. For example, the rewind application (104) may be configured to identify tax deductible activities performed by the user, activities that fall under a business related expense, etc.

The user interface (106) is configured to display questions presented by the rewind application (104) and obtain input from the user to answer the questions. Further, the user interface (106) is configured to obtain input from the user for the reconciliation of data. In addition, the user interface (106) is configured to display data associated with the user from which deductible activities are identified. For example, the user interface (106) may display financial data from a financial application, line items from a credit card statement, tracking data obtained by a GPS or tracking device, or any other data associated with the user that may be used to identify tax deductible activities of the user.

The electronic organization application (108) may be any locally stored or web-based application which the user uses as an organizer to store appointments, contacts, etc. For example, the electronic organization application (108) may be an address book application, a calendar application, or any application that includes address book and/or calendar functionality, such as an e-mail client. More specifically, for example, the electronic organization application (108) may be Microsoft Outlook® (Outlook is a registered trademark of Microsoft Corporation), Google™ Calendar, etc (Google is a registered trademark of Google Inc., Mountain View, Calif.). The electronic organization application (108) is configured to store a plurality of activities associated with the user. For example, the electronic organization application (108) may store a user's business appointments, charity events, doctor appointments, and/or the names and addresses associated with such appointments, such as the names and addresses of clients, doctors, charity drop-off locations, etc.

The third-party system (110) may be a server or computing device hosted by a third-party vendor or financial institution. In one or more embodiments of the invention, the third-party may be an organization associated with financial data management. For example, in one or more embodiments of the invention, the third-party may be a company that hosts software applications related to filing taxes, such as Intuit, Inc. In this case, the third-party system (110) may be a system for tax preparation.

In one or more embodiments of the invention, the third-party system (110) includes a repository (112) and a financial application (114). The repository (112) is a storage unit, such as a file, file system, database management system, relational database, spreadsheet, program memory, or other system for storing data. The repository (112) may be distributed across multiple vendors or financial institutions or stored with a single vendor or financial institution. Further, although shown as being associated with the third-party system (110), the repository (112) may be stored on the computing device (102) operated by the user. For example, the data repository (112) may be accessible using the Internet, an Intranet, or from a local storage device. In one or more embodiments of the invention, the repository (112) is configured to store data reconciled by the user and used by the rewind application (104). In one or more embodiments of the invention, in the case where the third-party system (110) is configured to aid a user in tax preparation, the repository (112) may be a deduction repository configured to store data identified by the rewind application (104) as being related to tax deductible expenses, such as mileage associated with a business trip.

The financial application (114) may be any financial management software used by a consumer to manage financial data. For example, a financial application may be an accounting application, a tax preparation application, a payroll application, an invoicing application, or any other type of financial application. Although shown as being associated with the third-party system (110), the financial application (114) may execute locally (e.g., on the computer device (102)) or remotely, such as from the third-party system (110). In one or more embodiments of the invention, the financial application (114) is tax preparation software that is configured to use the data related to tax deductions stored in the repository (112) to complete a user's taxes.

Figure 2:
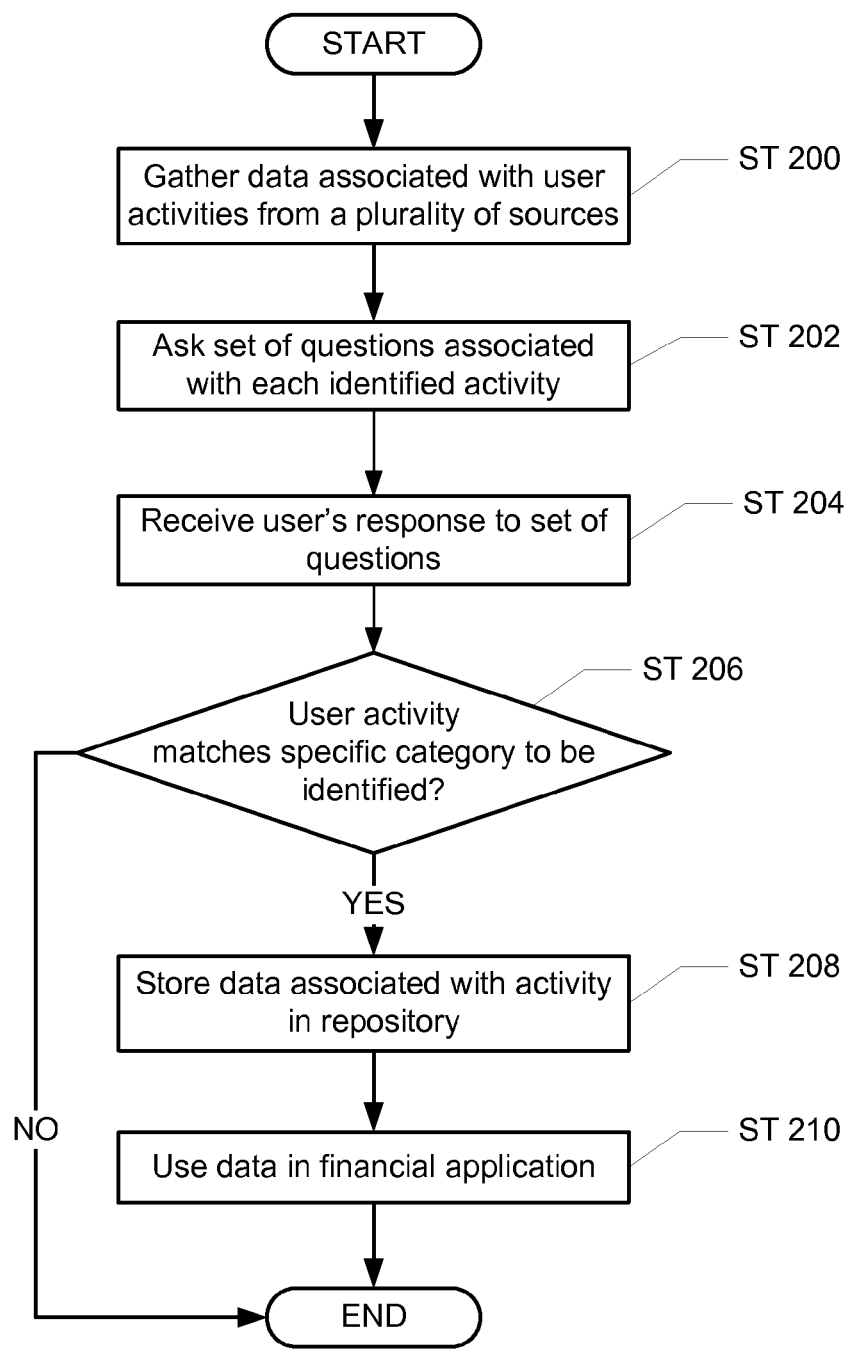
FIG. 2 shows a flow chart for performing a tax rewind from an application perspective in accordance with one or more embodiments of the invention.

FIG. 2 shows a flow chart for unwinding the activities performed by a user in accordance with one or more embodiments of the invention. Specifically, FIG. 2 shows a flow chart for unwinding a user's activities from the perspective of the rewind application. While the various steps in the flowchart of FIG. 2 are presented and described sequentially, one of ordinary skill in the art will appreciate that some or all of the steps may be executed in different orders, may be combined or omitted, and some or all of the steps may be executed in parallel. Accordingly, the specific arrangement of steps shown in FIG. 2 is not meant to limit the scope of the invention.

Initially, when the user is reconciling activities at the end of a day or a week, data associated with a user's activities is gathered from a plurality of sources (ST 200). In one or more embodiments of the invention, the rewind application may automatically initiate the gathering of user data after the expiration of a particular period time, e.g., at the end of each day, at the end of a week, etc. Alternatively, the rewind application may be initiated by the user when the user decides to reconcile financial data, which may not be at uniform time intervals. Specifically, data may be gathered from a user's banking information, a user's credit card statement, a user's GPS tracking device that tracks the mileage traveled by a user in a motor vehicle, an electronic organization application associated with a user, or any combination thereof. In one or more embodiments of the invention, the rewind application gathers data from an electronic organization application, such as a calendar application, and obtains data regarding a plurality of activities associated with the user. Next, the user is presented several questions associated with each identified activity (ST 202). In one or more embodiments of the invention, the set of questions may be presented using any type of communication mechanism supported by the user's computing device. For example, if the computing device is a smart phone or a PDA, then the set of questions may be presented via e-mail or text messages (e.g., short message service (SMS) messages). Alternatively, if the rewind application is a local application that is installed on a desktop or laptop computer, then the set of questions may be displayed on a user interface associated with the desktop or laptop computer. Further, the set of questions may be presented one at a time or all together (e.g., as a form that the user fills out) based on all the gathered data associated with the user.

In one or more embodiments of the invention, the set of questions may be questions related to determining whether the activity is of a particular category of activities. For example, the set of questions may determine whether the activity is one that may be categorized as a business expense, a tax deductible expense, or any other suitable category that may be used by the user to manage financial data. For example, in one or more embodiments of the invention, when the rewind application is parsing through a user's credit card purchases for the day or week, and identifies a potential business related purchase at a retailer such as Staples or Office Depot, the set of questions presented may require the user to confirm that the purchase made at the Staples or Office Depot was in fact business related. Alternatively, when the rewind application obtains data from a GPS tracking device, the set of questions may relate to inquiring whether a particular location driven to in a motor vehicle is a client location and/or whether the trip was made for a business reason. Upon presenting the set of questions, the rewind application is configured to receive the responses to the set of questions from the user (ST 204).

At this stage, a determination is made as to whether one of the activities performed by the user may be placed within a category to be identified by the rewind application (ST 206). That is, for example, if the rewind application is used to identify tax deductible activities, then the determination is made as to whether an identified activity may be categorized as a tax deductible activity. Thus, the rewind application identifies a subset of the plurality of activities associated with the user, where the subset of activities is of a pre-determined category type. If the activity is not one that falls into a specific category that the rewind application is identifying, then the process ends. Alternatively, if the activity is one that falls under a specific category the rewind application is configured to identify, then the data associated with the activity is stored in a repository (ST 208). The data associated with an identified activity may be an amount of a business related purchase, the number of miles driven to a business appointment or on a business trip, or any other suitable data associated with a business related expense. The repository in which the data is stored may be any database or web site, located on the user's computing device or hosted by a third party system. Subsequently, the stored data may be used in a financial application (ST 210). For example, if the rewind application identifies tax deductible expenses, the data associated with the tax deductible expenses may be stored in a repository that is linked to a tax preparation software and/or hosted by an organization that provides services for tax filing preparation.

The following scenarios illustrate examples of the method described in FIG. 2. For example, the rewind application may automatically initiate and begin to gather data from several sources associated with a user at the end of each week, when the user typically reconciles financial data. In this case, suppose the rewind application gathers data from the user's GPS tracking device. The GPS tracking device stores tracking data associated with where the user has traveled within the week. In this scenario, the questions presented by the rewind application may be associated with whether particular locations visited by the user were business related and whether any costs were incurred on a business related trip. The rewind application receives the answers to the questions from the user and subsequently stores the relevant data (e.g., miles traveled for business related trips) in a repository as a tax deductible or business related expense that the user may then use in tax preparation or to complete and submit business expense reports for reimbursement. In one or more embodiments of the invention, the rewind application is configured to print out expense reports on behalf of the user, based on the stored data.

Now suppose the rewind application gathers data from a user's credit card statement. In this scenario, the rewind application may automatically access the user's credit card statements online, or the rewind application may reconcile credit card data when the user accesses the credit card data. The rewind application may isolate line items in the credit card statements that may be business related and then confirm the nature of the isolated line items by presenting the user appropriate questions. The credit card purchases that were business related, such as a client dinner charge, a purchase at an office retailer, etc., are then stored in the repository and used for tax preparation or other financial data management applications.

In an alternate scenario, suppose the rewind application gathers data from a user's Outlook™ calendar and identifies that the user had a doctor's appointment and a calendar event entitled "Goodwill." In this case, the set of questions may be related to whether the entry entitled "Goodwill" is associated with a charity activity in which the user was involved. If the user's answer indicates that the entry "Goodwill" was in fact a charity activity, the next question presented may ask the user how many miles the user drove to perform the charity activity, how much time the user spent doing the charity activity, and/or how much the user donated to the charity. With respect to the doctor's appointment, the questions presented by the rewind application may determine who the doctor's appointment was for, the location of the doctor's appointment, and/or how many miles the user drove to the doctor. Based on the answers to questions such as those mentioned above, the rewind application may determine that one of the charity activity and the doctor's appointment (or both) are tax deductible activities and may store the data associated with the activities, such as the mileage driven and the expenses incurred (e.g., cost of gas) into the repository.

Using the method of FIG. 2, embodiments of the invention apply business intelligence to various data gathered from different sources to proactively aid users to capture all relevant financial activities performed by the user. Such relevant activities may then be applied to capture all tax deductible activities on behalf of the user, to ensure that the user is maximizing his/her tax deductions. More specifically, the rewind application is configured to build knowledge and learn business intelligence such as tax rules, deduction asset rules, relevant business expense rules, etc., and apply such business intelligence to the data collected from the user's activities.

Figure 3:
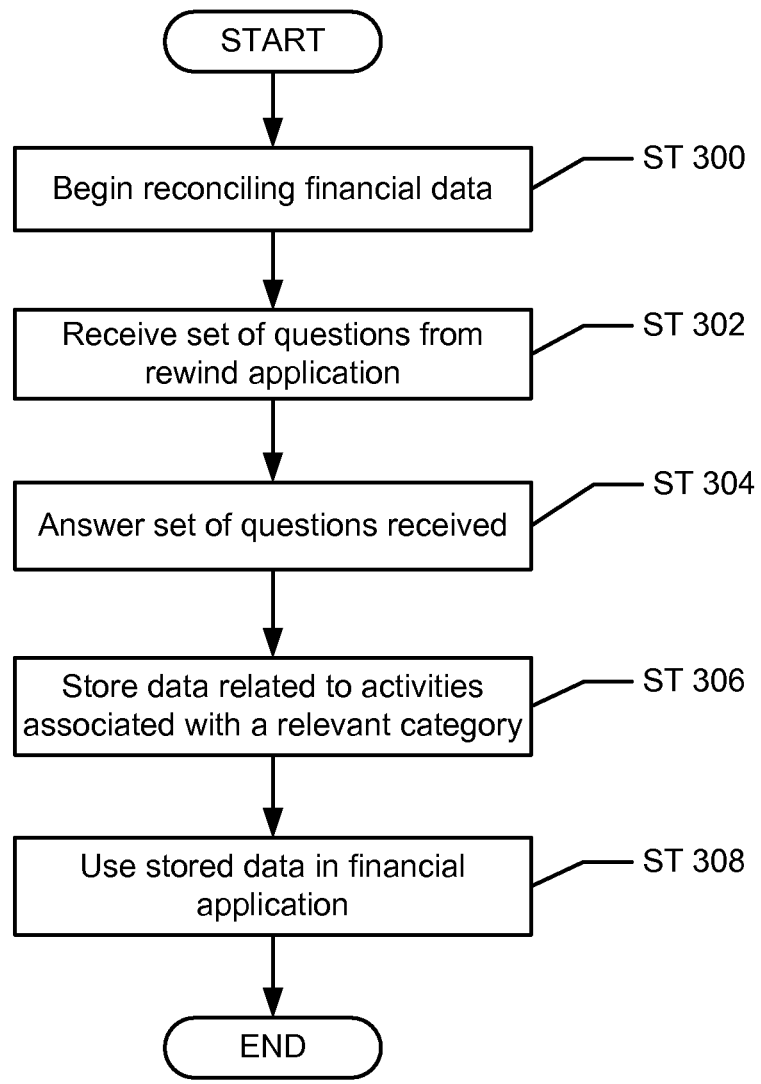
FIG. 3 shows a flow chart for performing a tax rewind from a user perspective in accordance with one or more embodiments of the invention.

FIG. 3 shows a flow chart for identifying a particular category of activities performed by a user in accordance with one or more embodiments of the invention. Specifically, FIG. 3 shows a flow chart from the user's perspective. While the various steps in the flowchart of FIG. 3 are presented and described sequentially, one of ordinary skill in the art will appreciate that some or all of the steps may be executed in different orders, may be combined or omitted, and some or all of the steps may be executed in parallel. Accordingly, the specific arrangement of steps shown in FIG. 3 is not meant to limit the scope of the invention.

Initially, the user beings reconciling financial data (ST 300). The financial data may be data associated with credit card statements, banking information, tracking data, or any other suitable form of data that the user may reconcile when performing accounting or business related functions. Subsequently, the user receives a set of questions from the rewind application (ST 302). As described above, the rewind application may execute locally on the user's computing device, may be downloaded and executed at specified predetermined time intervals, may be an application that executes in conjunction with an electronic organization application, etc. The user then answers the set of questions received (ST 304). The user's answers may be in the form of a reply e-mail message, a text message on a mobile or smart phone, command line interface answers, a fillable form that is submitted over a wired or wireless network, such as the Internet, or in any other suitable format for answering questions.

At this stage, the data associated with the activities that fall under a relevant category, such as tax deductible or business expense, is stored (ST 306). The data may be stored by the user on the user's local computing device, and/or on a web site or web application hosted by a third-party system to which the data is downloaded. The stored data is subsequently used (e.g., at a later point in time) in a financial application, such as a tax preparation software, a business expense report software, etc.

Figure 4:
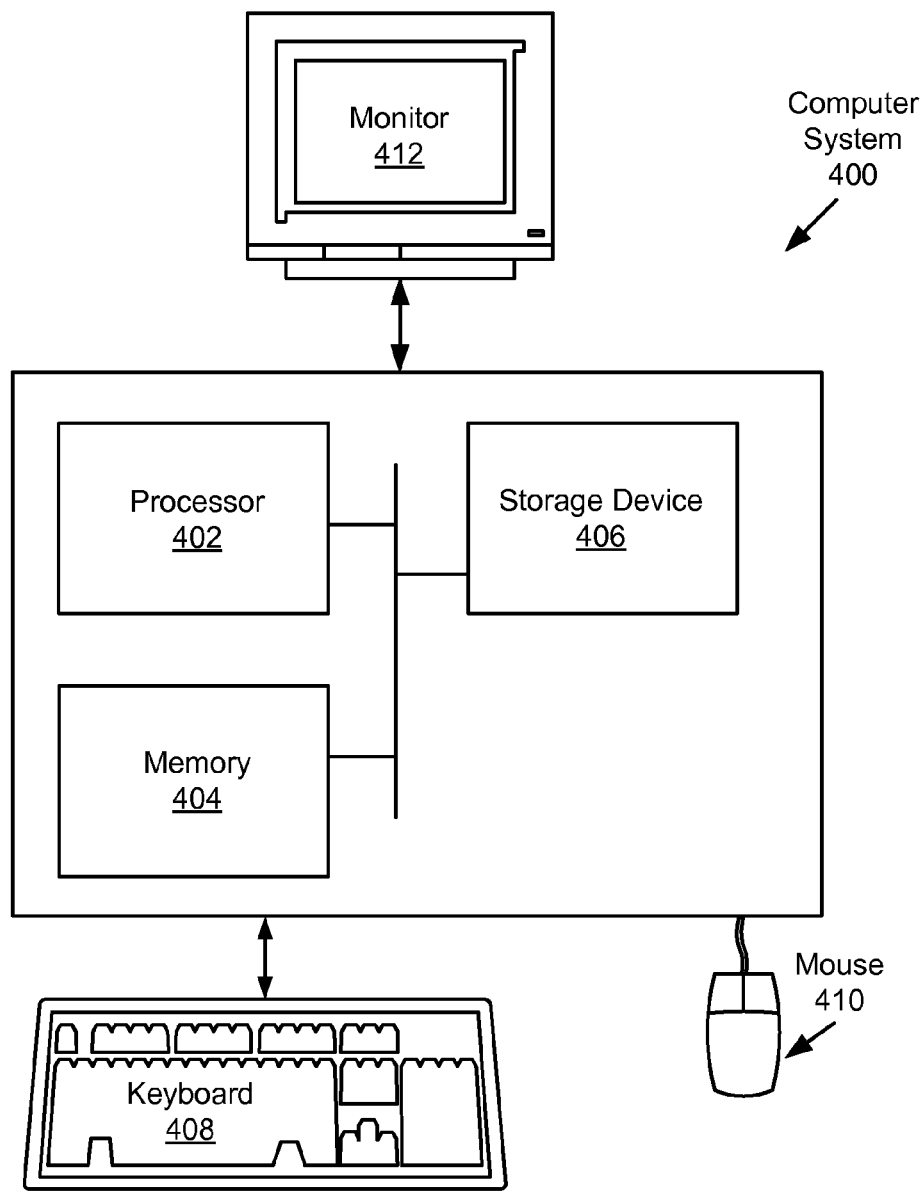
FIG. 4 shows a computer system in accordance with one or more embodiments of the invention.

Embodiments of the invention may be implemented on virtually any type of computer regardless of the platform being used. For example, as shown in FIG. 4, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor). The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., report generator, event manager, user application, etc.) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computing device of a user, comprising:
a processor;
a memory;
an electronic calendar application comprising software instructions stored in memory and executed on the processor to store a plurality of calendar events associated with the user; and
a rewind application configured as an intermediary application between the electronic calendar application and a financial application, and comprising software instructions stored in memory and executed on the processor to:
determine that a particular period of time has expired;
gather a subset of calendar events of the plurality of calendar events from the electronic calendar application, wherein the subset of calendar events comprises activities performed during the particular period of time;
determine a first question based on a first calendar event of the subset of calendar events obtained from the electronic calendar application;
present, to the user via a user interface, the first question associated with the first calendar event of the subset of calendar events obtained from the electronic calendar application;
receive, from the user via the user interface, a first response to the first question;
determine, based on the first response, that the first calendar event is a tax deductible activity; and
provide, to the financial application, data associated with the first calendar event and the first response for use in the financial application.

2. The computing device of claim 1, wherein the financial application is a tax preparation software.

3. The computing device of claim 1, wherein the electronic calendar application is configured to store a plurality of business appointments of the user.

4. The computing device of claim 1, wherein the first question is presented in an e-mail message.

5. The computing device of claim 1,
wherein the plurality of calendar events in the electronic calendar application are a plurality of credit card transactions made by the user.

6. The computing device of claim 5, wherein the determination, based on the first response, that the first calendar event is a tax deductible activity comprises a determination that the first calendar event is a business related purchase made by the user.

7. The computing device of claim 5, wherein the rewind application is further configured to automatically reset the period of time.

8. The computing device of claim 1, wherein the rewind application further comprises software instructions stored in memory and executed on the processor to:

determine a second question based on a second calendar event of the subset of calendar events obtained from the electronic calendar application;

present, to the user via the user interface, the second question associated with the second calendar event of the subset of calendar events obtained from the electronic calendar application;

receive, from the user via the user interface, a second response to the second question; and determine, based on the second response, that the second calendar event is not a tax deductible activity.

9. A non-transitory computer readable medium comprising instructions, when executed on a processor, for unwinding a plurality of calendar events of a user of a computing device, wherein the instructions are configured to:

determine, by a rewind application, that a particular period of time has expired, wherein the rewind application is configured as an intermediary application between an electronic calendar application and a financial application;

gather, by the rewind application, a subset of calendar events of the plurality of calendar events from the electronic calendar application, wherein the electronic calendar application is configured to store the plurality of calendar events associated with the user, and wherein the subset of calendar events comprises activities performed during the particular period of time;

determine, by the rewind application, a first question based on a first calendar event of the subset of calendar events obtained from the electronic calendar application;

present, by the rewind application to the user via a user interface on the computing device, the first question associated with the first calendar event of the subset of calendar events obtained from the electronic calendar application;

receive, by the rewind application from the user via the user interface, a first response to the first question;

determine, by the rewind application based on the first response, that the first calendar event is a tax deductible activity; and provide, by the rewind application to the financial application, data associated with the first calendar event and the first response for use in the financial application.

10. The computer readable medium of claim 9, wherein the financial application is a tax preparation software.

11. The computer readable medium of claim 9, wherein the electronic calendar application is configured to store a plurality of business appointments of the user.

12. The computer readable medium of claim 9, wherein the first question is presented via an e-mail message.

13. The computer readable medium of claim 9, wherein the plurality of calendar events in the electronic calendar application are a plurality of credit card transactions made by the user.

14. The computer readable medium of claim 13, wherein the determination, based on the first response, that the first calendar event is a tax deductible activity comprises a determination that the first calendar event is a business related purchase made by the user.

15. The computer readable medium of claim 9, wherein the software instructions are further configured to automatically reset the period of time.

16. The computer readable medium of claim 9, wherein the instructions are further configured to:

determine a second question based on a second calendar event of the subset of calendar events obtained from the electronic calendar application;

present, to the user via the user interface, the second question associated with the second calendar event of the subset of calendar events obtained from the electronic calendar application;

receive, from the user via the user interface, a second response to the second question; and determine, based on the second response, that the second calendar event is not a tax deductible activity.

17. A method for unwinding a plurality of calendar events of a user of a computing device, comprising:

determining, by a rewind application, that a particular period of time has expired, wherein the rewind application is configured as an intermediary application between an electronic calendar application and a financial application;

gathering, by the rewind application, a subset of calendar events of the plurality of calendar events from the electronic calendar application, wherein the electronic calendar application is configured to store the plurality of calendar events associated with the user, and wherein the subset of calendar events comprises activities performed during the particular period of time;

determining, by the rewind application executing on a processor of the computing device, a first question based on a first calendar event of the subset of calendar events obtained from the electronic calendar application;

presenting, by the rewind application executing on the processor to the user via a user interface on the computing device, the first question associated with the first calendar event of the subset of calendar events obtained from the electronic calendar application;

receiving, by the rewind application executing on the processor from the user via the user interface, a first response to the first question;

determining, by the rewind application executing on the processor based on the first response, that the first calendar event is a tax deductible activity; and providing, by the rewind application executing on the processor to the financial application, data associated with the first calendar event and the first response for use in the financial application.

18. The method of claim 17, wherein the plurality of calendar events in the electronic calendar application are a plurality of credit card transactions made by the user.

19. The method of claim 17, wherein the financial application is a tax preparation software.

20. The method of claim 17, further comprising:

determining a second question based on a second calendar event of the subset of calendar events obtained from the electronic calendar application;

presenting, to the user via the user interface, the second question associated with the second calendar event of the subset of calendar events obtained from the electronic calendar application;

receiving, from the user via the user interface, a second response to the second question; and determining, based on the second response, that the second calendar event is not a tax deductible activity.

* * * * *